RE 25,103

Oct. 28, 1958          J. D. EVERS          2,857,741

FUEL CONTROL WITH FEEDBACK

Filed Aug. 17, 1955          2 Sheets-Sheet 1

INVENTOR
JAMES D. EVERS
BY *Leonard F. Weblind*
ATTORNEY

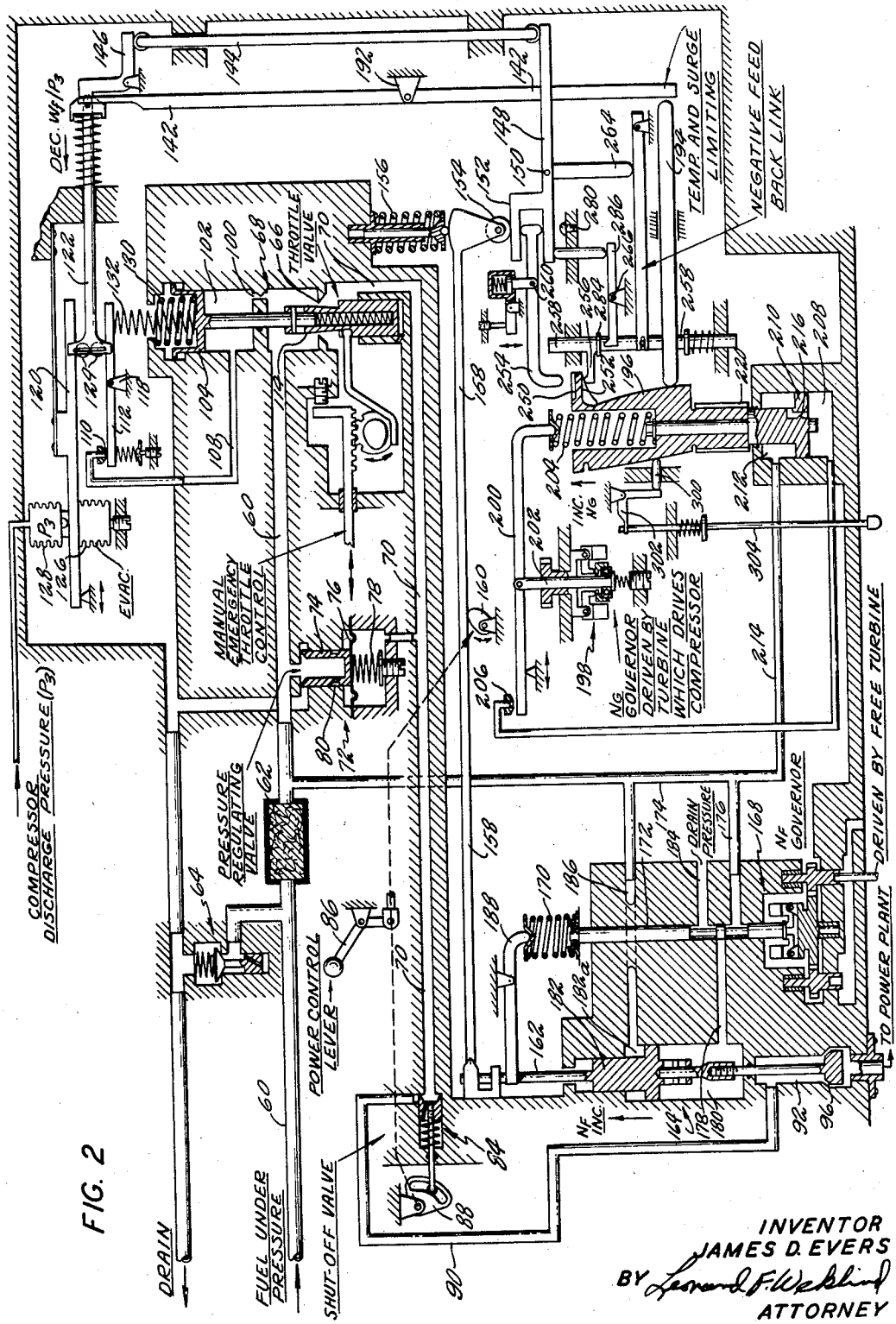

United States Patent Office 2,857,741
Patented Oct. 28, 1958

2,857,741

FUEL CONTROL WITH FEEDBACK

James D. Evers, Thompsonville, Conn., assignor to United Aircraft Corporation, East Hartford, Conn., a corporation of Delaware Application August 17, 1955, Serial No. 528,873

5 Claims. (Cl. 60—39.16)

This invention relates to fuel controls and more specifically to fuel controls for turbine type power plants.

It is an object of this invention to provide a fuel control for a multiple turbine type power plant whereby the fuel is regulated primarily as a function of the speed of one turbine multiplied by a function of compressor discharge pressure. The speed function is in turn modified by a mechanism responsive to the speed of the second turbine and includes a governor controlled cam which has a feedback connection to the governor.

These and other objects of this invention will become readily apparent from the following detailed description of the drawings in which:

Fig. 2 is a schematic illustration of a fuel control particularly adapted to controlling a turbine of the type shown in Fig. 1.

Figure 1:
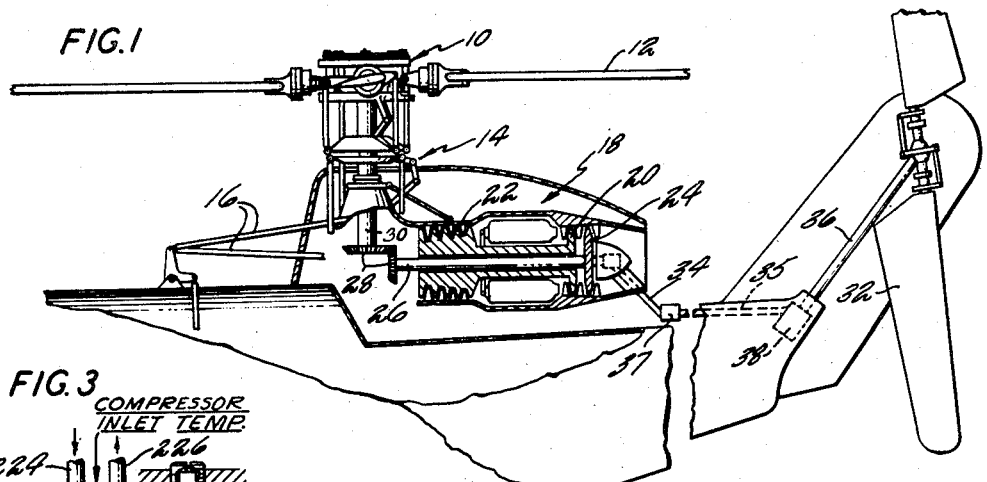
Fig. 1 is a fragmentary view of a helicopter having a turbine power plant installation according to this invention.

Referring to Fig. 1, a typical helicopter installation for a turbine type power plant is illustrated. The helicopter may have a main rotor 10 including variable pitch blades 12 whose pitch can be controlled by linkage 14 and in turn moved by main pitch control link 16. The particular operation of the various parts is more clearly illustrated in copending patent application 388,508 filed October 27, 1953, now Patent No. 2,811,324, issued October 29, 1957.

As seen herein, a turbine type power plant is generally indicated at 18. The power plant has a first stage turbine 20 which drives the compressor 22. A second stage turbine 24 has no connection to the turbine 20 or the compressor 22 but it drives the rotor 10 via the shaft 26, gears 28 and shaft 30. Since the first and second stage turbines are not physically connected to each other and the second stage turbine 24 drives only the rotor, it can be said that second stage turbine 24 is free or has only an aerodynamic connection with the compressor or the first stage turbine. In other words, only the fluid flow characteristics from the compressor and first stage turbine form any operative connection between these units. Since the second stage turbine 24 has no direct connection to the remainder of the power plant it is referred to as a free turbine. The speed of this free turbine 24 is referred to hereinafter as ($N_F$). The free turbine 24 also drives a tail rotor 32 via shafts 34, 35, 36 and couplings 37 and 38. In order to properly control this power plant rotor combination it is necessary to sense the speed of the free turbine 24 ($N_F$) and the speed of the turbine 20 including the compressor 22 and the speed of the latter is hereinafter referred to as ($N_G$). It is also necessary to sense compressor inlet temperature and compressor discharge pressure. The various ways in which these parameters of power plane operation are utilized in controlling a fuel flow is more clearly described in connection with Fig. 2.

The fuel control of this invention is schematically illustrated in Fig. 2. Generally, the control meters fuel as a function of speed multiplied by a function of compressor discharge pressure. The speed of the free turbine ($N_F$), in other words the turbine that drives the helicopter rotor, is utilized for steady state control. Maximum limiting however is induced as a force in the system as a function of the speed of the turbine which drives the compressor and a function of the inlet air temperature and compressor discharge pressure. These basic parameters or variables of power plant operation each function to control fuel control in a manner to be described hereinafter.

Referring to Fig. 2, fuel under pressure flows into the main line 60 and through a filter 62. The pressure relief valve is generally indicated at 64 and prevents fuel pressure from exceeding a given value. Fuel from the main line 60 is metered through an orifice 66 in the main throttle valve generally indicated at 68. The metered fuel flows past the orifice 66 and then to the line 70. A pressure regulator valve 72 is shunted across the throttle valve inlet line 60 and the valve outlet line 70. The pressure regulating valve 72 maintains the pressure drop across the metering orifice 66 at a predetermined value. The pressure regulating valve 72 includes a piston 74, a diaphragm 76 and a spring 78. The bottom of the diaphragm 76 is exposed to fuel pressure on the downstream side of the throttle valve. The top side of the diaphragm is exposed to fuel pressure at the inlet side of the throttle valve. Fuel under pressure from the main line 60 flows into an orifice and land 80 into piston 74. The piston 74 has a lapped fit with its surrounding wall but the fit is not sufficient to prevent passage of fuel to the upper side of the diaphragm 76. By passing high pressure fuel to the upper side of the diaphragm in this manner a damping effect is provided. Metered fuel in the line 70 then flows past a manual shut-off valve generally indicated at 84. The shutoff valve 84 is operatively connected to the main power control lever 86 by means of a lost motion member 88. The shutoff valve is intended to positively cut off fuel when the power control lever is moved to a closed position. Metered fuel flows past the shutoff valve 84 into the line 90 and then into the chamber 92 past an overspeed shutoff valve 96 and then to the power plant. The operation of the overspeed shutoff valve 96 will be described hereinafter.

In the main throttle valve 68 the fuel under inlet pressure passes through a restriction 100 and into the chamber 102 wherein it acts on the bottom of a piston 104. This high pressure fuel flows into line 108 and thence out of an orifice 110. The rate with which the fuel is discharged from the orifice depends upon the position of the lever or valve member 112. For a given opening of the orifice 110 there will be a certain pressure in the chamber 102 acting on the piston 104. It will be noted that movement of the piston 104 causes movement of the integral throttle valve stem 114 to thereby vary the area of the metering orifice 66. The lever 112, which varies the opening of the orifice 110, pivots about the point 118 and controls the position of the servo piston 104 and hence the opening of the throttle valve. The lever 112 is, in turn, positioned by a combination of two main forces, one of these forces is that produced in the lever 120 and the other force is produced by the lever 122 through its rollers 124. The lever 120 has a force imposed upon it by means of a pair of bellows 126 and 128. The bellows 126 is evacuated while the inside of bellows 128 is exposed to compressor discharge pressure ($P_3$) so that these bellows impose a force or signal in lever 120 as a function of compressor discharge pressure absolute. The lever 122 has a force imposed thereon for a function of speed, or speed and temperature, in a manner to be described hereinafter.

When compressor discharge pressure increases, the force on lever 120 is increased in a downward direction thereby causing the rollers 124 to move down and the right hand of lever 112 to move downwardly a slight increment thereby decreasing the flow from the orifice 110. This increases the pressure in the chamber 102 beneath the piston 104 thereby moving the piston 104 in an upward direction against the force of the heavy spring 130. This results in an increase of the opening of the main throttle valve. This upward movement of the throttle valve stem 114 and the servo piston 104 causes an increase in force on the right-hand end of lever 112 through the action of a force feedback spring 132, and restores to their balanced position the members 112 and 120.

Referring again to the link 122 of the force multiplying mechanism, the rollers 124 permit the link 122 to move to the left or right in response to motion of the vertical link 142. This motion of link 122 varies the mechanical advantage of the links 112 and 120 such that there will be a different throttle valve setting for a given force application on the links 112 and 120. It should be added that when mentioning that any of the parts have motion this motion is extremely small and the system is primarily a force balance system. Thus if there is any motion imparted to the member 122 the moment arms through which the other forces are acting will change to cause a force unbalance. The throttle valve 114 will then assume a new position to rebalance the forces. Thus motion of 122 toward the right increases the moment arm of the force acting through 120 on rollers 124 and in turn the moment arm of the right side of 112 which acts on spring 132. This unbalance will be reflected in an increase in throttle valve opening and a rebalancing of the system.

The link 122 is moved to the left or right via the link 142 in response to one or more of several parameters of power plant operation depending on whether the control is in steady state operation or under maximum limiting operation such as during acceleration overspeed or underspeed. The link 122 is also controlled by the vertical link 144 which actuates a pivoted bell crank-type member 146 through link 142. The vertical link 144 is operated by a member 148 which is pivoted at 150 intermediate the ends thereof and has its left end terminated in a bifurated portion 152. The portion 152 is engaged by a roller 154 which is backed up by a spring 156 and is located at the right-hand end of a bar 158. The bar 158 is pivoted about a cam 160 which cam is rotated by the power control lever 96. The left-hand end of the bar 158 is connected by a link 162 to a servomotor generally indicated at 164. The servo piston 182 provides a motion proportional to speed of the free turbine ($N_F$) such that combined with the desired speed setting of the cam 160, the right-hand end of the bar 158, including the roller 154, is moved, rotating link 148 about pivot 150 and thereby translating vertical rod 144 which then would be positioned proportional to speed error. This motion or speed error in turn is transmitted through the bell crank 146 and to the rod or link 122 to the throttle mechanism so as to adjust the throttle valve in a manner to be described below. This speed error signal is the main governing signal of the fuel control.

This governing is accomplished by the governor generally indicated at 168 in the lower left-hand corner of Fig. 2. The flyball governor 168 is driven by the free turbine or the turbine which drives the rotor of the helicopter, or the propeller in the case of a turboprop type installation. The flyball force of the governor 168 is opposed by a spring 170 such that the servo valve 172 moves up or down in response to a force unbalance allowing either high pressure fluid to flow from the line 174 to the line 176, then to the line 178, to the chamber 180, to the bottom of the servo piston 182; or low pressure fluid to flow from line 178 through the pilot valve to line 184. It should be noted that the chamber 182A of the servo piston 182 is connected continuously to high pressure fluid via the line 186.

Movement of the servo piston 182 readjusts the force exerted by the spring 170 through the operation of lever 188 to rebalance the force exerted by the governor flyballs and stop the motion of the servo valve 172 and the servo piston 182. From the foregoing, it is apparent that the position of the servo piston 182 will at all times be proportional to the free turbine speed ($N_F$). It is further apparent then that the left-hand end of the longitudinal bar 158 is subjected to a position proportional to free turbine speed while, intermediate the ends of the bar 158, the cam 160 is positioned in proportion to desired speed whereby the right-hand end of the bar 158 provides a signal proportional to the speed error at any particular instant. The right-hand end of bar 158 including its roller 154 sends the speed error signal through the bifurcated end of the bar 152 of the bar 148 to the vertical link 144 etc. to position the throttle valve accordingly.

To follow a typical operation of the speed signal, consider the condition where the load on the helicopter rotors is suddenly reduced for some reason which causes the rotor and the free turbine to overspeed. In this event, the flyballs of the governor 168 will move outwardly forcing the servo valve 172 in an upward direction thereby allowing high pressure fluid to act on the body of the servo piston 182 and moving the servo piston upwardly. Through the action of the lever 188, the spring 170 will be compressed thereby rebalancing the flyball force and stopping the motion of the pilot valve 172 and the servo piston 182. However, the new position of the servo piston 182 will be transmitted through the link 162 to the bar 158 to vary the position of the roller 154 on the bifurcated end 152 of link 148. This motion rotates lever 148 counterclockwise on pivot 150 moving the rollers 124 toward decrease fuel flow per unit compressor discharge pressure through action of links 144, 146, 142 and 122.

The steady state governing assembly includes an overspeed valve 96 which is connected to the bottom of the servo piston 182. For a given overspeed condition and upward movement of the servo piston 182, the valve 96 will assume a closed position so as to prevent flow of fuel to the power plant. This overspeed valve 96 is necessary in a helicopter installation.

The relative inertia of the power plant and rotor are such that dangerous overspeeds might readily cause disintegration of the power plant if the normal fueling control elements had to be relied upon to suddenly decrease fuel flow under certain conditions; thus, the position of the servo piston 182 is the best indicator of an overspeed condition and acts substantially instantly to regulate or shut off the flow of fuel.

As previously mentioned, the rollers 124 and the link 122 are also subject to motion from the vertical link 142 which is pivoted intermediate its ends at 192 during acceleration limiting. The lower end of link 142 is engaged by a rod 194 which has its left end in engagement with a cam 196. The cam 196 is both reciprocable along its vertical axis and also rotatable about that axis. To the left of the cam 196 a governor is generally indicated at 198. The governor 198 senses the speed of the compressor, and of course, the turbine which drives the compressor. The governor 198 exerts a force on a lever 200 by means of the vertical member 202. The lever 200 is pivoted to the member 202 and the lever 200 has its right-hand end in engagement with a spring 204 while the left-hand end of the lever 200 varies the opening of an orifice 206. Hence, any variation in compressor speed changes the area of the orifice or valve 206 thereby changing the pressure in the chamber 208 at the lower-most portion of the three-dimensional cam 196. The pressure in the chamber 208 controls the position of a piston 210 which, in turn, moves the cam 196 vertically. The chamber 212 on the upper side of the piston 210 is continuously fed high pressure fuel via a line 214. This high pressure fuel passes through a restriction 216 in piston 210 and thence to chamber 208. The pressure in the chamber 208 is varied in accordance with the opening of the orifice 206 which opening, in turn, is controlled via the governor 198. As in the previously described servo mechanism, any change in position of the servo piston 210 and its attached three-dimensional cam 196 will vary the compression of the spring 204 to rebalance the system, that is, to restore the opening of the orifice 206 whereby the system is in balance. Thus, the three-dimensional cam 196 has a different axial position for every compressor speed.

Figure 3:
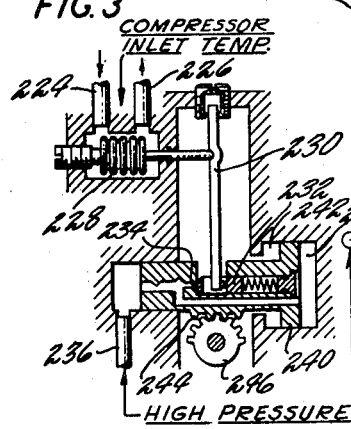
Fig. 3 is a schematic illustration of the temperature sensing servo mechanism.

The three-dimensional cam 196 is rotated about its vertical axis through a gear 220. The mechanism for rotating the cam is schematically illustrated in Fig. 3. Thus, compressor inlet air is circulated through the lines 224 and 226 so that the bellows 228 expands or contracts in relation to the temperature of the inlet air. The bellows 228 is linked to a vertical rod 230 which at its lower end is connected to a servo valve 232. The servo valve 232 varies the opening of the orifice 234 which is receiving high pressure fluid from a line 236. This high pressure fuel flows to the right-hand side 238 of servo piston 240, but, the valve 232 and the orifice 234 control the pressure to the left-hand side 242 of the piston 240. Hence, any variation in position of the valve 232 varies the position of the servo piston 240 and its integral rack 244 thereby rotating the gear segment 246 which is equivalent to the gear 220 on the three-dimensional cam of Fig. 2.

The three-dimensional cam 196 also includes at its upper end cam surfaces 250 and 252. These surfaces are intended to engage the left-hand end of lever 254 and the arm 256 respectively. The arm 256 is integral with a vertically movable rod 258. It is thus seen that during limiting the cam surface 196 can move the horizontal rod 194 and the cam surfaces 250 and 252 can effect the rods 254 and 256 respectively.

Assuming, for example, that the compressor speed has increased to a value where it is to be limited from further increase for optimum engine performance and safety, the cam surface 250 will engage the left end of the topping lever 254 and will rotate the lever 254 clockwise about its pivot 260 thereby also causing the rod 148 to move counterclockwise about its pivot 150. This motion is transmitted to the vertical link 144 and bell crank 146 to the horizontal link 122 to move it in a decreased fuel flow per compression discharge pressure direction.

Movement of the main cam 196 in a downward direction in response to a decrease in compressor speed toward a dangerously low R. P. M. will cause the cam surface 252 to engage the arm 256 and cause downward motion thereof along with the rod 258. This eventually causes the rod 286 to rotate counterclockwise about its pivot 266 thereby forcing the left-hand end of the bar 148 upwardly. This motion is transmitted to the vertical link 144 through bar 148 and then to the horizontal link 122 which is moved in a fuel per unit compressor discharge pressure increase position. Thus the control provides a "topping" and "bottoming" function to prevent excessive speed or too low a speed.

Maximum and minimum fuel flow limiting for a transient operation of the engine is described immediately following. During an acceleration of the engine it is desirable to have the largest fuel flow per unit compressor discharge pressure possible in order to provide fast response to the pilot's motion of the power lever. In order to prevent compressor surge and overtemperature, however, it is necessary to limit the maximum fuel flow for given conditions. Herein, the limiting is accomplished as a schedule of fuel flow in proportion to a function of compressor speed, compressor inlet temperature and compressor discharge pressure. Thus, as seen in the lower right-hand corner of Fig. 2, the horizontal link 194 assumes a position as a function of compressor speed and compressor inlet temperature through the main cam 196. The link 194 in turn transmits a position to the vertical link 142 which imposes a limit on the horizontal link 122 to prevent its further movement toward an increase fuel flow per unit compressor discharge pressure. Therefore, if the power control lever 86 calls for an increase speed through its cam 160, the right-hand end of the rod 158 tends to move upwardly thereby rotating rod 148 clockwise about its pivot 150 thereby permitting the vertical link 144 to move downwardly and the main horizontal link 122 to move toward an increase fuel flow per compressor discharge pressure. This increase fuel flow per unit compressor discharge pressure signal, however, will be limited by the particular position of the limiting links 194 and 142, depending upon the particular compressor speed and inlet temperature existing at that instant.

Minimum fuel flow per compressor discharge pressure is established by a stop 280 which engages the left-hand end of link 148. A negative feedback link identified in Fig. 2 is provided for reasons described immediately hereafter. The operation of the negative feedback link is best described by referring to the curves shown in Fig. 4. The standard plot of the ratio of fuel flow to compressor discharge pressure vs. speed (in this case the speed of the engine compressor) is shown. Line A represents the maximum allowable fuel flow per compressor discharge pressure for engine acceleration as established by the characteristics of the engine for prevention of pressure surge and overtemperature conditions. This is the fuel flow limit that is accomplished in the control by the main cam 196 of Fig. 2. Line B represents fuel flow limiting as accomplished by means of the minimum flow stop 280. Line C is the steady state characteristic of the engine. Lines D and E are established by the "bottoming" and "topping" functions of the control respectively. Lines F, G, H, I and J represent lines as established by the free turbine governor 168 of Fig. 2.

Assuming that the pilot calls for 100% rotor speed by means of rotating speed setting cam 160 in a suitable manner the engine will operate at point K (i. e. 100% engine speed) if the expected design load is present at the rotor of the helicopter. If the load on the helicopter rotor and consequently the load on the power or free turbine should decrease, the rotor and turbine combination would tend to overspeed and the governing mechanism would call for less fuel flow in order to correct for said overspeed. If, for example, a 1% overspeed should occur line G on Fig. 4 would represent the fuel flow vs. compressor discharge pressure ratio which the governing portion of the control would call for, if a 2% overspeed occurred line H would represent the fuel flow ratio called for by the control, and so on. In the case of a 1% overspeed resulting from a decrease in load on the helicopter rotor and power turbine combination, speed of the engine would be decreased such that operation would now occur at point L on the engine steady state line. Similarly, for an overspeed of 2% the engine would operate at point M on the steady state line. Now if an overspeed of slightly more than 2%, say 2.2% should occur, a certain fuel flow ratio as evidenced by line Q would be called for and the engine would be expected to operate at the point where said line intersects the engine steady state curve. It is this region of engine operation represented by the steady state curve between line P and the bottoming line D where an unstable condition could exist. Thus a means for providing a greater degree of stability becomes desirable. Lines R, S, T, and U represent such a provision and are accomplished in the control by means of the negative feedback link and its attending mechanism.

Figure 4:
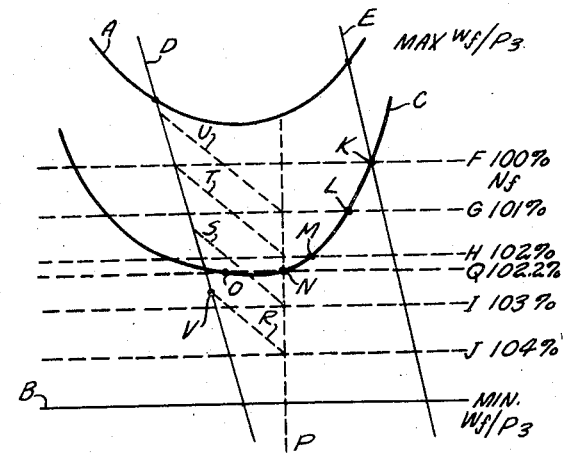
Fig. 4 is a graphic illustration of engine operating curves.

Still referring to Fig. 4, let it be assumed that the governing portion of the control is calling for a decrease in fuel flow per unit compressor discharge pressure as a result of an overspeed of the power turbine and that the speed of the engine is decreasing toward a value represented at line P. The bottoming cam surface of Fig. 2 will contact the arm 256 and via the rod 258 will move the left-hand end of the negative feedback in a downward direction thereby allowing link 264, which engages the feedback link, to move in a downward direction. This moves the pivot 150 downwardly thereby permitting the right side of rod 148 to move in a downward direction thus calling for an increase in fuel flow per unit compressor discharge pressure at a rate which is increasing with a decrease in engine speed. This provides the characteristic as indicated by lines R, S, T, and U. If the overspeed is of the magnitude such as indicated by lines J and R, the negative feedback line will intersect the bottoming governor line which in turn will limit the decrease in engine speed. If the speed of the engine decreases to the value represented by point L in Fig. 4 the shoulder (Fig. 2) 234 of vertical rod 258 will contact the bottoming lever 286 which, in turn, causes the bar 148 to move downward at its right-hand end and pivot about 150 to sharply increase fuel flow per unit compressor discharge pressure.

The necessity of the negative feedback provision is explained by the consideration of the response times of the various elements in the system in connection with a consideration of engine characteristics in respect to fuel consumption and the variation of compressor discharge pressure over a speed range.

Figure 5:
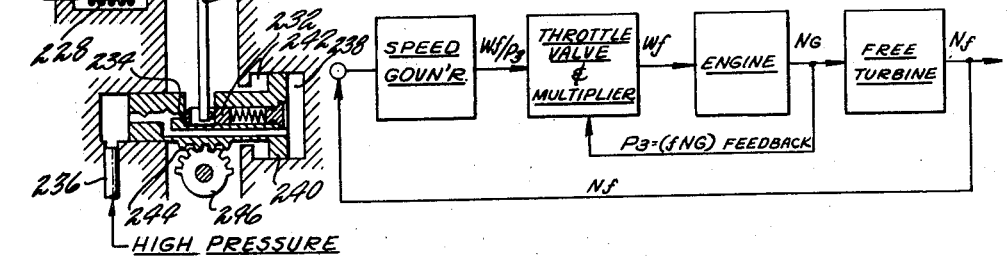
Fig. 5 is a block diagram of the engine and fuel control combination.
Figure 6:
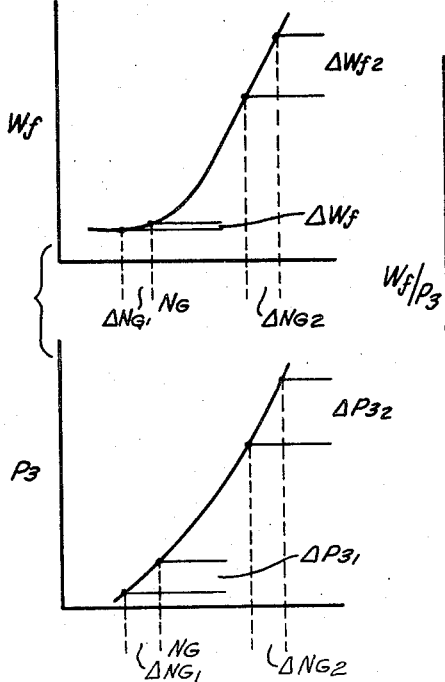
Fig. 6 illustrates curves for fuel flow and compressor discharge pressure at various speeds.

Looking at Fig. 5 and keeping in mind the nature of the connection between each box of the block diagram it will be evident that two of said connections are of a relatively slow acting type. Since the only connection between the engine and the free turbine is one of an aerodynamic nature, response of the free turbine to change in engine speed will be slow in comparison with the response of other elements. Likewise, since the signal sent back to the speed governor which is responsive to the speed of the free turbine is dependent upon the response time of said free turbine, it will have a relatively slow response time. The effect of feeding the compressor discharge pressure back to the throttle valve and multiplier is to effectively increase the gain of the system since the feedback is of a positive nature. If, for example, the speed governor calls for an increase in fuel flow per unit compressor discharge pressure as a result of an underspeed existing in the free turbine, as the engine speed increases the compressor discharge pressure signal fed back to the multiplier will likewise increase since an increase in engine speed causes an increase in compressor discharge pressure. The effect of the compressor discharge pressure feedback therefore is to further increase the flow of fuel to the engine which effect occurs because of the delay in the signal indicative of a changed free turbine speed reaching the speed governor to call for a decrease in fuel flow. It will therefore be seen that, if for any region of the engine's operation the compressor discharge signal which is being fed back to the engine multiplier and throttle valve is of an unduly large magnitude, unstable system operation will result from the extremely high gain caused. This may occur in the region enclosed by the lines P and D of Fig. 4 for the following reasons:

Fig. 6 illustrates the engine characteristics as regards fuel consumption and compressor discharge pressure over a similar speed range. From an examination of the two curves it will be seen that at a relatively high speed the change in fuel flow for a given change in speed is of a magnitude similar to the magnitude of the change in compressor discharge for the same change in speed. However, at lower speeds (enclosed by lines P and D of Fig. 3) the change in compression discharge pressure for a given change in speed is considerably larger than the change in fuel flow for the same change in speed. Thus, at these low speeds the compressor discharge pressure signal (referring again to Fig. 5) fed back to the throttle valve and multiplier has a larger effect for a given speed error than its effect for the same speed error in a higher speed region.

The negative feedback provision previously described, acts to decrease the magnitude of the speed error signal entering the throttle valve and multiplier unit, thereby decreasing the gain of the system and tending to balance the effect of the compressor discharge pressure feedback in the critical speed region. Thus a more stable operation is provided by its incorporation. Other methods for accomplishing the same purpose would be to incorporate a lag in the compressor discharge pressure feedback or to improve the response time of the free turbine and thereby provide a faster subtracting signal for the speed governor. It should be noted that the necessity of incorporating the feedback or other corrective measures arises only because in the particular application at hand it is necessary to operate the engine in the critical speed region and if it were possible to restrict operation of the engine to the right of line P in Fig. 3 the provision of feedback or other means similar would probably not be necessary.

Referring again to Fig. 2 it will be noted that the main three-dimensional cam 196 is engaged on its left side by a follower 300 which in turn actuates a bell crank 302 and a rod 304. The rod 304 is intended to provide another signal which is a function of compressor speed and compressor inlet temperature. This signal may be sent through a servo device and may, for example, control some member or portion of the power plant. A typical use for such a signal is to vary the angle of the stator blades in the compressor for different operating conditions.

As a result of this invention, it is apparent that a fuel control has been provided having particular novel features.

Although only one embodiment of this invention has been illustrated and described herein it will be apparent that various changes and modifications may be made in the construction and arrangement of the various parts without departing from the scope of this novel concept.

What is desired by Letters Patent is:

1. In a fuel control for a turbine type power plant having a compressor and a combustion chamber for generating propelling gases, a first turbine for driving said compressor and driven by said gases, a source of fuel under pressure, means for regulating the flow of fuel from said source to said combustion chamber, a rotor, a second turbine driven by the gases from said combustion chamber for driving said rotor, means responsive to the speed of said second turbine for producing a first signal, means responsive to compressor pressure for producing a second signal, means for multiplying said signals for controlling said regulating means, means for modifying said first signal including means responsive to the speed of said first turbine including a governing device, a member movable by said governing device, a servo device controlled by said member and having operative connections to said means for producing said first signal, and a separate connection between said servo device and said member.

2. In a fuel control for a turbine type power plant having a compressor and a combustion chamber for generating gases, a first turbine for driving said compressor and driven by said gases, a source of fuel under pressure, means for regulating the flow of fuel from said source to said combustion chamber, a rotor, a free turbine driven by the gases from said combustion chamber for driving said rotor, means responsive to the speed of said free turbine for producing a first signal, means responsive to compressor pressure for producing a second signal, means for multiplying said signals for controlling said regulating means, means for modifying said first signal including means responsive to the speed of said first turbine including a governing device, said last mentioned means including a servo device controlled by said governor device and operatively connected to said means responsive to the speed of said free turbine, and a mechanical connection between said servo device and said governing device.

3. In a fuel control for a turbine type power plant having a compressor and a combustion chamber for generating gases, a first turbine for driving said compressor and driven by said gases, a source of fuel under pressure, means for regulating the flow of fuel from said source to said combustion chamber, a second turbine driven by the gases from said combustion chamber, means responsive to the speed of said second turbine for producing a first signal, means responsive to compressor pressure for producing a second signal, means for multiplying said signals for controlling said regulating means, means for modifying said first signal including means responsive to the speed of said first turbine including a governing device, a member reciprocable by said governor, a beam pivotally supported on said member intermediate its ends, a pilot valve controlled by one end of said beam, a servo device regulated by said pilot valve including a movable cam, said cam having operative connections to said means for producing said first signal, and means operatively connecting said cam to said beam.

4. In a fuel control for a turbine type power plant having a compressor and a combustion chamber, a first turbine for driving said compressor, a source of fuel under pressure, means for regulating the flow of fuel from said source to said combustion chamber, a second turbine driven by the gases emitted from said first turbine, means responsive to the speed of said second turbine for producing a first signal, means responsive to compressor pressure for producing a second signal, means for multiplying said signals for controlling said regulating means, means for modifying said first signal including means responsive to the speed of said first turbine including a governing device, a member reciprocable by said governor, a beam pivotally supported on said member intermediate its ends, a pilot valve controlled by one end of said beam, a servo device regulated by said pilot valve, said servo device having operative connections to said means for producing said first signal, and means for operatively connecting said servo device to the other end of said beam.

5. In a fuel control for a turbine type power plant having a compressor and a combustion chamber, a first turbine for driving said compressor, a source of fuel under pressure, means for regulating the flow of fuel from said source to said combustion chamber, a second turbine driven by the gases emitted from said first turbine, means responsive to the speed of said second turbine for producing a first signal, means responsive to compressor pressure for producing a second signal, means for multiplying said signals for controlling said regulating means, means for modifying said first signal including means responsive to the speed of said first turbine including a governing device, a member reciprocable by said governor, a beam pivotally supported on said member intermediate its ends, a pilot valve controlled by one end of said beam, a servo device regulated by said pilot valve including a movable cam, said cam having operative connections to said means for producing said first signal, and means operatively connecting said servo device to the other end of said beam.

References Cited in the file of this patent

UNITED STATES PATENTS

| | | |
|---|---|---|
| 2,603,063 | Ray | July 15, 1952 |
| 2,625,789 | Starkey | Jan. 20, 1953 |
| 2,629,982 | Hooker | Mar. 3, 1953 |
| 2,668,415 | Lawrence | Feb. 9, 1954 |
| 2,759,549 | Best | Aug. 21, 1956 |